H. SPLITDORF.
Electric Battery.
No. 52,617.
Patented Feb. 13, 1866.
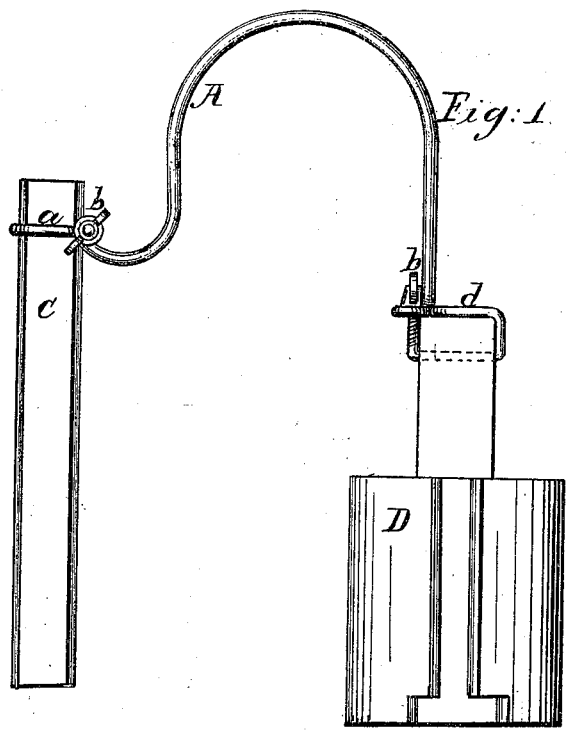
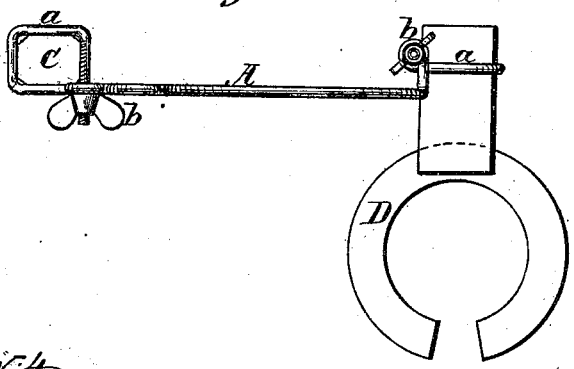
Witnesses:
Inventor:
Henry Splitdorf

UNITED STATES PATENT OFFICE.

HENRY SPLITDORF, OF NEW YORK, N. Y.

IMPROVEMENT IN CONNECTIONS FOR GALVANIC BATTERIES.

Specification forming part of Letters Patent No. 52,617, dated February 13, 1866.

*To all whom it may concern:*

Be it known that I, HENRY SPLITDORF, of the city, county, and State of New York, have invented a new and useful Improvement in Galvanic Batteries; and I do hereby declare that the following is a full, clear, and exact description thereof, which will enable those skilled in the art to make and use the same, reference being had to the accompanying drawings, forming part of this specification, in which—

Figure 1 represents a side elevation of this invention. Fig. 2 is a plan or top view of the same.

Similar letters of reference indicate like parts.

This invention relates to an improvement in the clamp which serves to connect the elements of a galvanic battery; and it consists in a clamp made of one piece of wire, bent to the desired form, and provided with screws and nuts at both ends, in such a manner that by tightening up said nuts the wire is caused to take a firm hold of the carbon or zinc, or of any other element or elements used, and a clamp is obtained which is cheaply made and readily connected and disconnected.

A represents my clamp, which is made of a piece of brass wire or other suitable material, and bent at both ends, so that loops $a$ are formed, capable of slipping over the carbon element C, or over the shank of the zinc element D, or over the equivalent parts of any other element used in constructing a galvanic battery.

The loops $a$ are drawn up tight by means of nuts $b$, which screw on the ends of the clamp, and said nuts are so arranged that by their action the loops are tightened up from all sides, and an equal and uniform pressure is exerted on the parts to which the clamp is attached.

A clamp of this kind can be made cheap. It can be readily connected to or disconnected from the elements, and by its use the construction of a galvanic battery is greatly simplified.

It is obvious that instead of using round wire flat or square wire might be used in the construction of my clamps, and I do not wish to restrict myself to the precise kind of wire shown in the drawings; neither do I wish to confine myself to any particular form, but reserve the right to change the same as circumstances may render desirable.

What I claim as new, and desire to secure by Letters Patent, is—

A clamp for connecting the elements of a galvanic battery, said clamp being made of a piece of wire bent so as to form loops at both ends, and provided with screw-threads and nuts, which serve to tighten up said loops, substantially as and for the purpose set forth.

HENRY SPLITDORF.

Witnesses:
M. M. LIVINGSTON,
C. L. TOPLIFF.